INVENTOR.
JACK L. BAYER
BY
Cushman, Darby & Cushman
ATTORNEYS

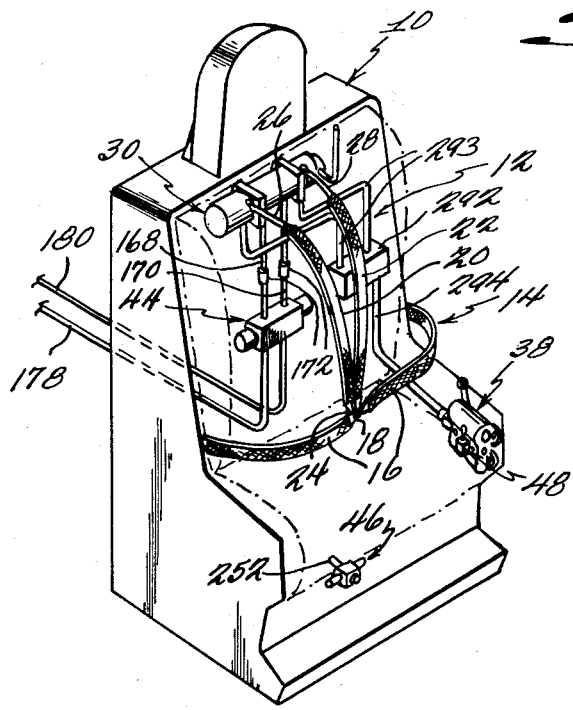
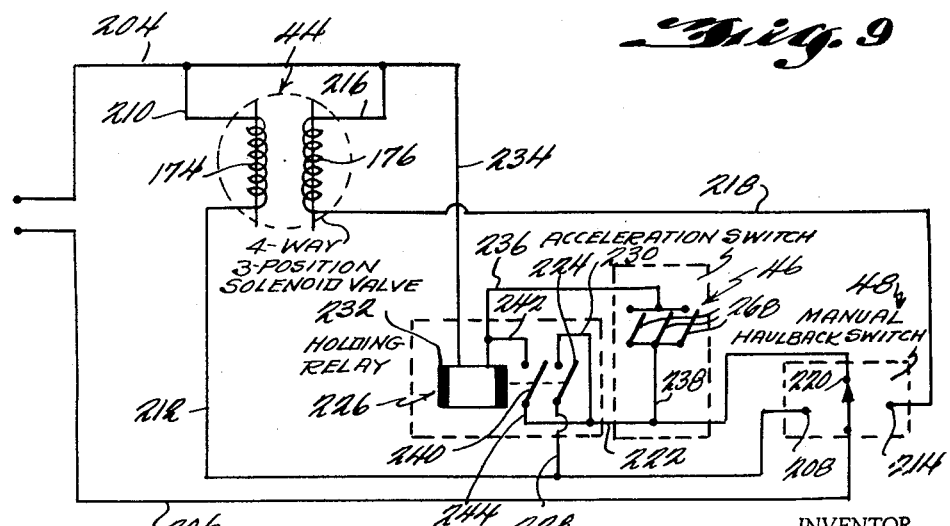

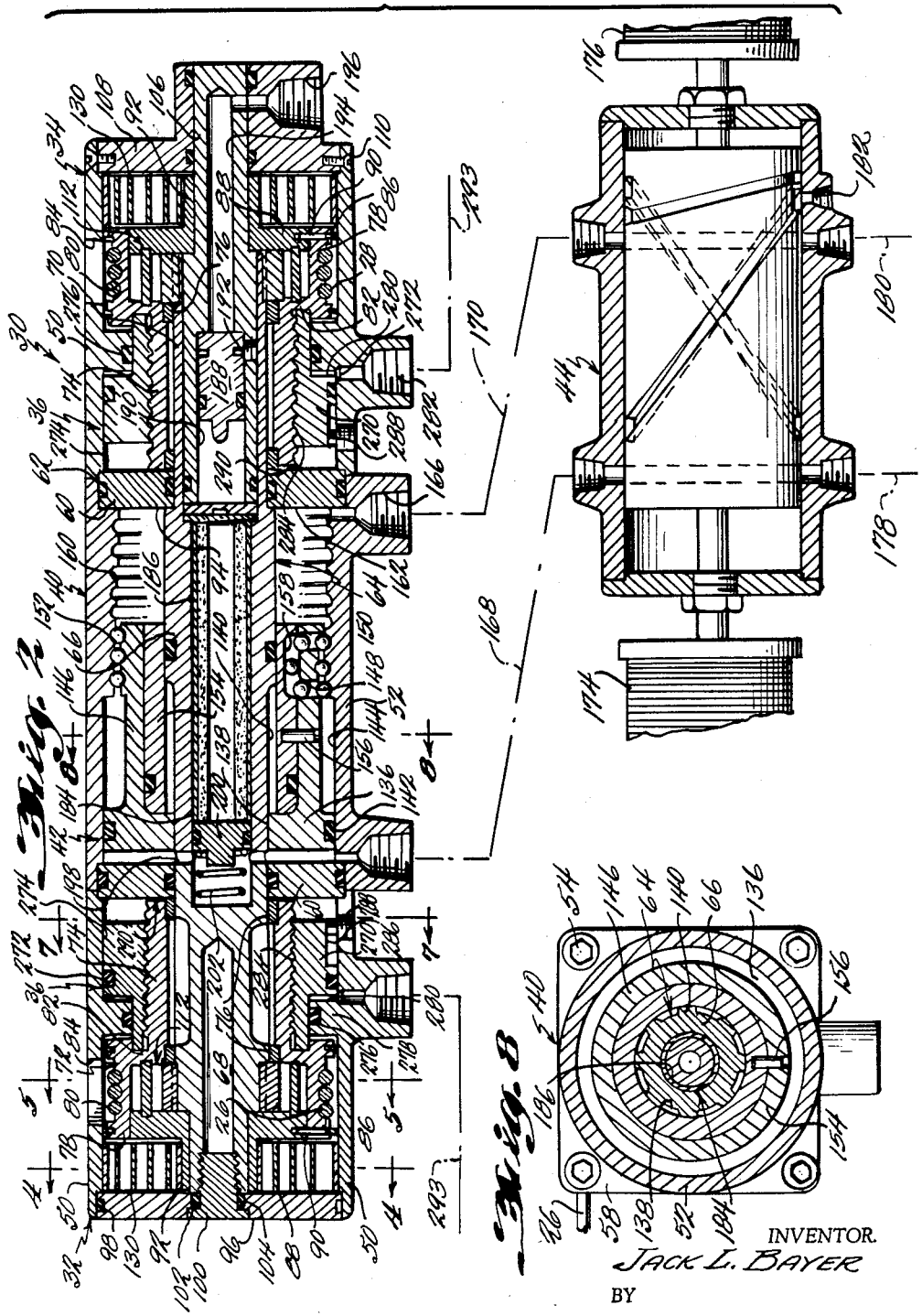

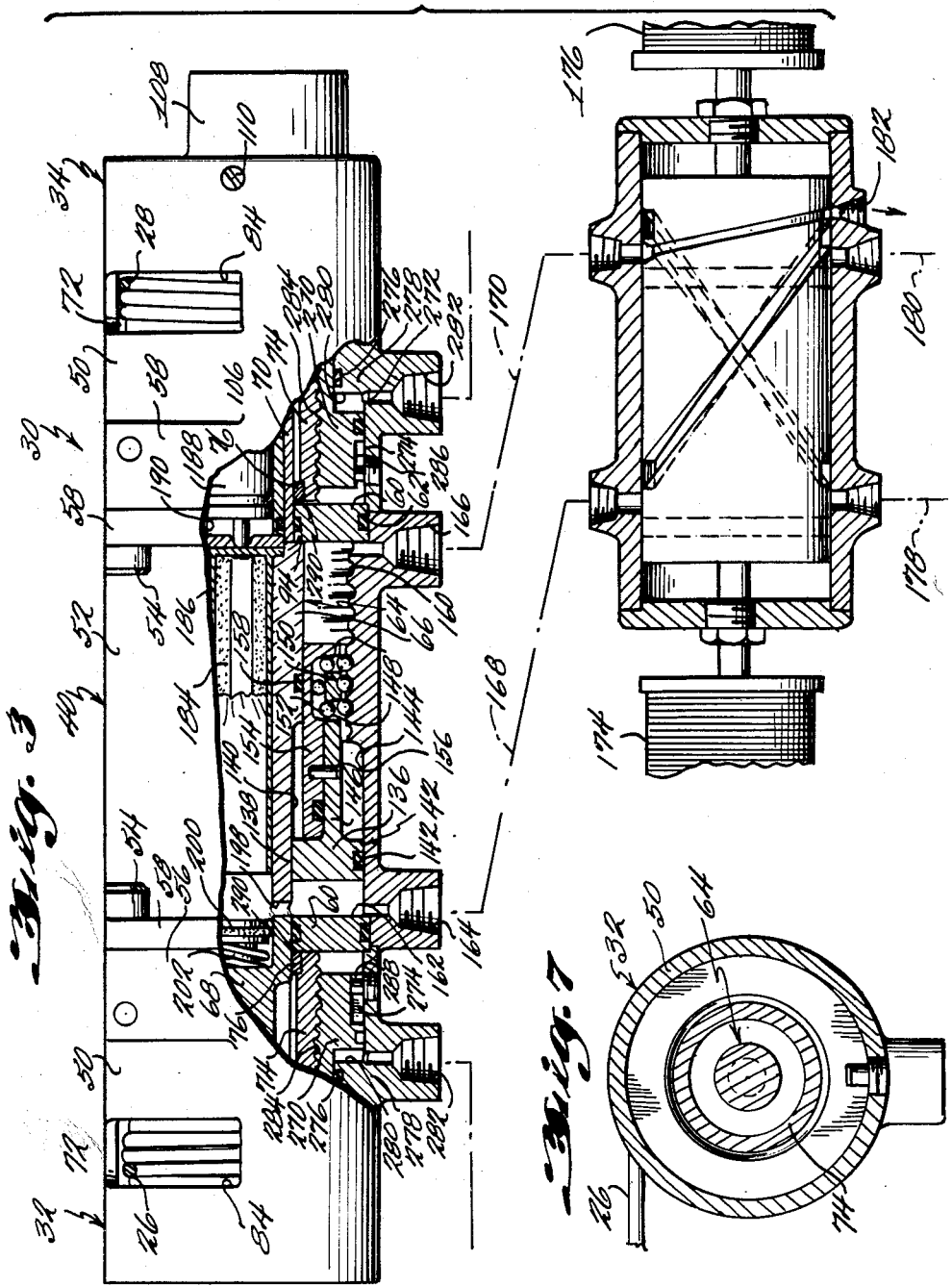

INVENTOR.
JACK L. BAYER 3,178,136
SAFETY DEVICE FOR A SEAT OCCUPANT EMBODYING A BALLISTIC ACTUATED REEL
Jack L. Bayer, Phoenix, Ariz., assignor to Rocket Power, Inc., Mesa, Ariz., a corporation of Arizona
Filed Feb. 1, 1963, Ser. No. 255,633
25 Claims. (Cl. 244—122)

This invention relates to a safety device for aircraft and other vehicles and more particularly to a safety device embodying a ballistic actuated reel for controlling movement of the occupant of an aircraft seat or other vehicular seat both under normal operative conditions and emergency conditions.

The use of a ballistic actuated reel as part of the equipment embodied in a pilot escape system has been known for some time. It is generally conventional at the present time to employ ballistic actuated reels to effect man-seat separation during the ejection procedure. Moreover, ballistic actuated reels are utilized to effect movement of the seat occupant against the back of the seat through the operation of the shoulder straps of the harness prior to actual ejection. An example of such a reel is illustrated in commonly assigned Strickland application Serial No. 781,014, filed December 17, 1958 and issued on February 12, 1963, as Patent Number 3,077,324.

A ballistic actuated reel of the type disclosed in the Strickland patent includes a reel to which is connected at one end a flexible elongated element, the opposite end of which is connected with the shoulder straps of the harness. The reel is provided with a return spring against the action of which the reel is rotated in response to the extension of the elongated element as when the seat occupant moves away from the seat back. The return spring serves to rotate the reel in a direction to maintain the elongated element in a generally taut condition during the movement of the seat occupant toward the seat back. Under normal conditions, the seat occupant can move in the seat without any substantial restraint from the reel device. Such devices are normally provided with a means for effectively stopping outward extension of the elongated element as a result of abnormal movements of the seat occupant away from the seat back, such as would occur where the aircraft is suddenly decelerated under emergency conditions.

Heretofore, the rotation stopping means is rendered operable by sensing movement of an inertia member. In some instances the inertia member is positioned with respect to the aircraft proper so as to move when the aircraft itself is suddenly decelerated. In other instances the inertia member rotates with the reel and is capable of moving with respect to the reel when the acceleration of the reel exceeds a predetermined amount. Usually, the movement of the inertia member operates to effect interengagement between a rachet and pawl mechanism connected between the reel and the housing thereof so that a positive locking of the reel against rotation will occur in response to either a predetermined deceleration of the aircraft or a predetermined rotary acceleration of the reel resulting from an extension of the elongated element.

In my copending application Serial Number 255,603, filed concurrently herewith, there is disclosed a reel in which the means for stopping outward extension of the elongated element under emergency conditions does not utilize movement of an inertia member to sense the condition at which the stopping means is operated. On the contrary, this reel senses a predetermined pressure condition within a body of fluid, preferably hydraulic fluid. In addition, the stopping means rather than effecting a positive lock, embodies a friction brake which provides the advantage that the movement of the seat occupant under emergency conditions is retarded before it is completely stopped, thus minimizing the peak force to which the seat occupant is subjected. The above mentioned reel which is described in my copending application is specifically constructed to function in automotive vehicle usage although, of course, the principles embodied in the invention are equally applicable to aircraft usage.

Accordingly, an object of the present invention is the provision of a reel device of the type described having means for effectively retarding and stopping abnormal outward extension of the elongated element connected with the reel and means cooperating therewith which render the reel particularly suited for aircraft usage, it being understood, however, that the principles of the present invention are equally applicable to automotive vehicle usage.

Another object of the present invention is the provision of a reel device of the type described having means for retarding and stopping abnormal outward extension of the elongated element which is operable in response both to a predetermined velocity of outward extension and to a predetermined acceleration force.

Another feature of the reel as described in the above mentioned Strickland patent is the provision of a ballistic actuated means for effecting a rapid rotation of the reel in a direction to wind up the elongated element, and hence move the seat occupant into an erect position with respect to the seat back preparatory to actual ejection of the man and seat from the aircraft. Such a means is inherently a "one shot proposition" and serves an essentially useful function in the overall ejecting procedure. The ballistic actuated retraction means is operatively associated with the reel through a lost motion connection which permits the reel to function both under normal conditions as well as under emergency conditions in the manner set forth above. When the ballistic charge is ignited, the lost motion connection is overridden and a retracting rotational movement of the reel is effected. While it is desirable to hold the seat occupant in an erect position against the seat back prior to ejection, such action may also be advantageous under other emergency conditions which may exist at a time well before ejection is accomplished. Consequently, it is desirable to provide for a retractive movement of the reel which can be repeated rather than utilized only as a "one shot proposition."

Accordingly, it is another object of the present invention to provide a safety device of the type described which provides both for ballistic retraction of the reel prior to ejection and for alternative power retraction of the reel which is independent of ballistic power retraction and which can be repeated.

Another object of the present invention is the provision of a safety device of the type described in which the alternate power retraction means is automatically operable in response to predetermined acceleration or deceleration condition of the aircraft.

Still another object of the present invention is the provision of the safety device of the type described in which the alternate power retraction means is selectively manually operable.

Another object of the present invention is the provision of a reel device of the type described including two reel sections and a central power section for effecting power retraction of the reels of both of the reel sections.

Still another object of the present invention is the provision of a safety reel device of the type described having a pair of reel sections which are capable of normal independent rotational movement with respect to each other, and a power section capable of effecting retraction of the reels of the reel sections irrespective of the independent rotational positions of the reels.

Still another object of the present invention is the provision of a ballistic actuated reel embodying a simple but efficient construction having applicablity as a power retracted reel in various environments.

These and other objects of the present invention will become more apparent during the course of the following detailed description and appended claims.

The invention may best be understood with reference to the accompanying drawings wherein an illustrative embodiment is shown.

In the drawings:

FIGURE 1 is a schematic perspective view of an aircraft seat having safety apparatus embodying the principles of the present invention operatively connected therewith;

FIGURE 2 is a vertical longitudinal sectional view of the reel device embodying the principles of the present invention, showing the power retraction control valve mechanism associated therewith, the parts being illustrated in the position they assume just prior to power retraction;

FIGURE 3 is a view similar to FIGURE 2 with certain parts shown in elevation rather than section, illustrating the position of the parts just after the ejection procedures have been initiated;

FIGURE 7 is a sectional view taken along the line 7—7 of FIGURE 2;

FIGURE 8 is a sectional view taken along the line 8—8 of FIGURE 2;

FIGURE 9 is a wiring diagram of the electrical circuit for controlling the safety device;

Figure 10:
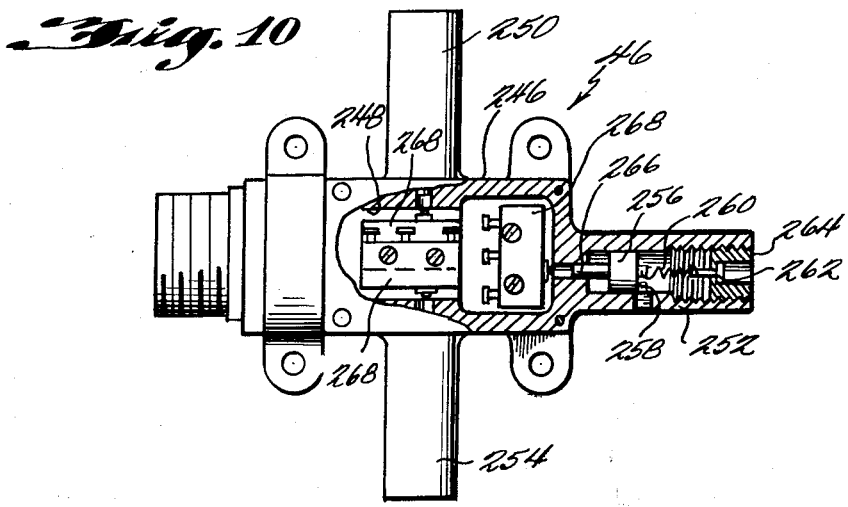
FIGURE 10 is an elevation view, partly in section, of one embodiment of an acceleration sensitive switch utilized in the electrical circuit shown in FIGURE 9.

Referring now more particularly to the drawings, there is shown in FIGURE 1 a seat structure, generally indicated at 10, which may be of any conventional construction preferably of a type suitable for use in an aircraft vehicle and capable of being ejected therefrom with an occupant seated therein. In accordance with the principles of the present invention, there is provided in the seat construction 10 a safety apparatus, generally indicated at 12 which includes a seat occupant harness assembly, generally indicated at 14. The harness assembly 14 may be of any conventional construction and, as shown, includes a pair of seat belt straps 16 having one end anchored to the seat assembly 10 and the opposite end detachably connectable together, as by the conventional seat belt coupling assembly 18. The harness assembly 14 also includes a pair of shoulder belt straps 20 and 22. One end of the shoulder belt straps 20 and 22 is suitably anchored to the seat assembly 10, as by a coupling assembly 24 detachably connectable with the coupling assembly 18, and the opposite ends thereof are connected with a pair of elongated elements 26 and 28. The elongated elements 26 and 28 are shown in the form of wire cables which are connected through suitable couplings to the shoulder belt straps 20 and 22 respectively. However, it will be understood that the elongated elements 26 and 28 may be formed of the same strap material and be made integral with the belt straps 20 and 22.

Movement of the shoulder belt straps 20 and 22 is controlled by the extension and retraction of the elongated elements 26 and 28 from a reel device, embodying the principles of the present invention and generally indicated at 30. The reel device 30 comprises a pair of reel sections, generally indicated at 32 and 34, which are associated respectively with the elongated elements 26 and 28. Each reel section is provided with a reel stopping mechanism, generally indicated at 36, for effectively stopping the rotation of the reel in a direction corresponding to the extension of the associated elongated element in response to a predetermined rotational velocity of the reel and to a predetermined acceleration of the aircraft. Both reel stopping mechanisms are operable under the control of a single manual control assembly, generally indicated at 38, in a manner hereinafter to be more fully explained.

The reel device also includes a central power section, generally indicated at 40, including a fluid actuated reel retracting mechanism, generally indicated at 42, for effecting a power retraction of both of the reel sections 32 and 34. The power section 40 is adapted to be connected with the hydraulic system of the aircraft vehicle and is controlled by a valve mechanism generally indicated at 44, which in turn is controlled by an electrical circuit including an inertia or acceleration sensitive switch assembly, generally indicated at 46, and a manually controlled switch assembly 48.

Referring now more particularly to FIGURES 2 through 8, each reel section includes a generally cylindrical housing part 50. The inner end of each cylindrical housing part 50 is connected in abutting engagement with one end of a cylindrical housing part 52 of the power section 40, by any suitable means, such as a plurality of exterior bolts 54 extending throughoutwardly projecting lugs 56 and 58 formed respectively on the housing parts 50 and 52, as shown in FIGURE 3. The interior periphery of each housing part 50 and the adjacent interior periphery of the housing part 52 are formed with annual grooves to receive the outer peripheral portion of a ring-like divider wall 60. Preferably, the outer periphery of each ring-like divider wall is sealed with respect to the associated cylindrical housing parts, as by an annular seal 62 or the like. The central portion of each divider wall 60 is apertured to receive an elongated rigid structure generally indicated at 64, rotatably mounted within the central apertures of the dividing walls and having a central portion 66 disposed within the power section 40 and a pair of end portions 68 and 70 disposed within the reel sections 32 and 34, respectively.

Disposed within the housing part 50 of each reel section 32 and 34, is a reel generally indicated at 72. Each reel 72 includes a generally cylindrical hub portion 74 which is mounted on the associated end portion of the elongated structure 64 for rotary movement and for limited axial movement, as by a pair of bearing assemblies 76 or the like. Each reel includes a generally cylindrical elongated element receiving portion 78 which, as shown, is preferably provided with a spiral groove 80 on the central outer periphery thereof for receiving the cables which constitute the elongated elements 26 and 28, respectively. As best shown in FIGURE 2, each hub portion 74 is integrally joined at one end with the associated portion 78 adjacent the opposite end thereof through a radially extending annular portion 82.

As best shown in FIGURE 2, each housing part 50 has an opening 84 formed in the central portion thereof through which the respective elongated element extends outwardly from the associated reel 72. Preferably, a pair of annular sealing elements 86 are provided in the outer periphery of each reel portion 78 on opposite sides of the associated spiral groove 80 for engaging the inner periphery of the associated housing part 50 on opposite sides of the associated opening 84. The end of each reel portion 78 is detachably fixedly connected with an annular member 88, as by a pin 90 extending through registering apertures formed in each member 88 and the associated reel portion, as is clearly shown in FIGURE 2. The central portion of each annular member 88 is apertured and has a sleeve-like portion 92 extending longitudinally therefrom. The sleeve portion 92 associated with the reel section 32 is journalled on the extremity of the end portion 68 of the elongated structure 64.

It will be noted that the elongated structure 64 is mounted for rotational movement and is held against axial movement in one direction by engagement of a shoulder 94 with the divider wall 60 associated with the reel section 34 and in the opposite direction by the engagement of the extremity of the end portion 68 with the central inner portion of an end closure 96 which is sealably engaged within the adjacent end of the associated housing part 50, as by an annular seal 98, and retained therein, as by a headed bolt 100 threadedly engaged within the extremity of the elongated structure end portion 68 with the head thereof disposed in engagement with a shouldered aperture 102 formed in the central portion of the end closure 96. Desirably, an annular seal 104 is provided between the aperture 102 and the bolt 100 permitting the latter to rotate together with the elongated structure 64 and with respect to the end closure 96.

The sleeve portion 92 associated with the reel section 34 is journalled on a reduced end portion of an igniter member 106, the opposite end portion of which is engaged within the end portion 70 of the elongated rigid structure 64. The extremity of the reduced end portion of the member 106 is engaged within a central opening formed in an end closure 108 engaged within the outer end of the housing part 50 of the reel section 34 and secured therein, by any suitable means, such as bolts 110. As best shown in FIGURE 2, the outer extremities of the sleeve portions 92 are disposed in spaced relation to the central interior portion of the associated end closure.

Figure 5:
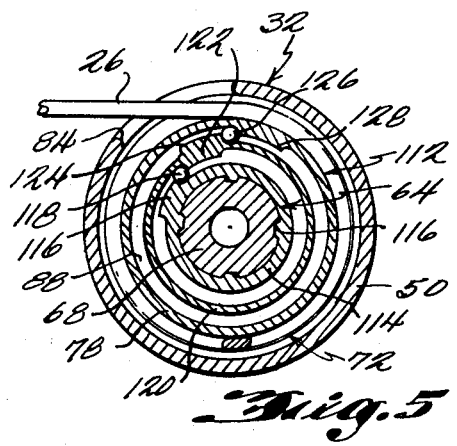
FIGURE 5 is a sectional view taken along line 5—5 of FIGURE 2, illustrating the parts in one limiting position.
Figure 6:
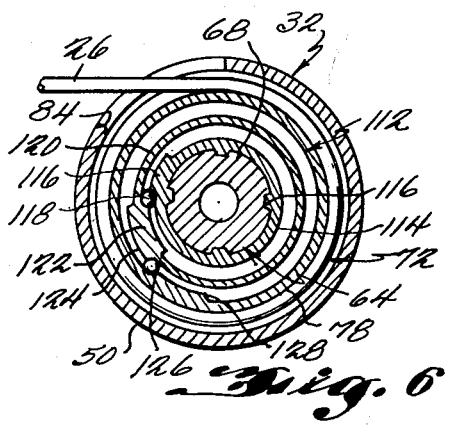
FIGURE 6 is a view similar to FIGURE 5 illustrating the parts in an opposite limiting position.

It can thus be seen that each reel 72 is mounted for rotational movement with respect to the elongated structure 64 and for limited axial movement. However, the elongated rigid structure 64 is connected with each reel by a limiter assembly or lost motion connection, generally indicated at 112. As best shown in FIGURES 2, 5 and 6, each limiter assembly includes an inner sleeve-like member 114 having its inner periphery splined, as indicated at 116, for engagement with cooperating grooves formed on the associated end portion of the elongated structure 64. Each inner member 114 is thus capable of longitudinal movement with respect to the elongated structure 64 but is constrained to rotate therewith. Formed on the outer periphery of each inner member 114 is a land portion 116, the ends of which are arranged to engage a roller 118 disposed in rolling contact with the remaining portion of the outer periphery of the associated inner member and the inner periphery of an intermediate ring member 120. As best shown in FIGURE 2, each ring member 120 is mounted for rotational movement between the associated reel portion 82 and the associated annular member 88, as by suitable annular grooves formed therein.

Formed on the inner periphery of each intermediate ring member 120 is a land portion 122 similar to the land portion 116, the ends of which are arranged to abuttingly receive the roller 118 and a similar land portion 124 is formed on the outer periphery of each intermediate ring member 122. As before, the land portion 124 has its ends shaped to abuttingly receive a second roller 126 which, like the roller 118 is disposed in rolling contact with the remaining portion of the outer periphery of the associated intermediate ring member 120 and the interior periphery of the associated reel portion 78. Finally, the interior periphery of each reel portion 78 is provided with a land portion 128, the ends of which are arranged to abuttingly receive the roller 126.

It can thus be seen that each reel 72 is capable of independent rotary movement with respect to the elongated structure 64 between two limiting positions shown in FIGURES 5 and 6. FIGURE 5 illustrates the position of the reel when a maximum amount of the associated elongated element has been extended. It will be noted that further extension of the elongated elements can not be accomplished without effecting a rotational movement of the elongated element 64, since the land portion 28 is in abutting engagement with the roller 126 which is in turn in abutting engagement with the land 124 on the intermediate ring member. The land portion 122 of the intermediate ring member is likewise in abutting engagement with the roller 118 which in turn is in abutting engagement with the land portion 116 which is effectively rotationally locked to the rigid elongated structure 64. In the fully retracted position shown in FIGURE 6, further retractive rotary movement of the reel is prevented due to the abutting engagement of the rollers 118 and 126 with the opposite ends of the various land portions.

The rotational movement of the reels afforded by the lost motion connections 112 is sufficient to permit the elongated elements to be moved from the fully retracted position to the fully extended position which, as shown is accomplished in slightly less than four revolutions of the reels. During the first revolution of the reel, one end of the land portion 128 will move out of engagement with the roller 126 until the opposite end thereof contacts the roller. During the next revolution, the land portion 128 will move the roller 126 from the one end of the land 124 to the opposite end thereof. During the next revolution, the land portion 122 of the intermediate ring member will move away from the roller 118 until the opposite end engages the same and finally, during the fourth revolution, the land member 122 will move the roller 118 from the one end of the land 116 until it engages the opposite end thereof as shown in FIGURE 6.

Figure 4:
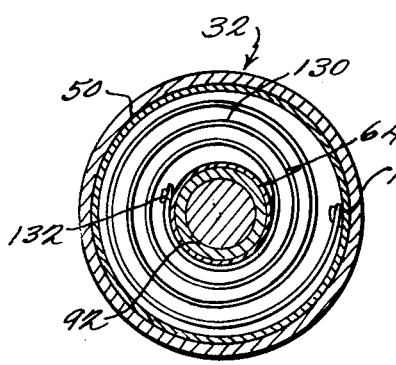
FIGURE 4 is a sectional view taken along the line 4—4 of FIGURE 2.

The movement of each reel with respect to the elongated rigid structure 64 from the fully retracted position shown in FIGURE 6 to the fully extended position shown in FIGURE 5, is against the resilient action of a spiral spring 130. As best shown in FIGURE 4, the inner end of each spiral spring 130 is suitably attached to the outer periphery of the associated sleeve portion 92, as indicated at 132, and the outer end thereof is connected with the adjacent inner peripheral portion of the associated housing part 50, as indicated at 134. The strength of the spring 130 is such that it offers a minimum resistance to the extensive movement of the elongated element while at the same time providing sufficient strength to effect a rotational movement of the associated reel in a clockwise direction, as viewed in FIGURES 4 through 6, so as to maintain the associated elongated element in a substantial taut condition when the seat occupant moves toward the seat back.

It will also be noted that when either one of the reels is disposed in the position shown in FIGURE 5, a clockwise rotational movement of the elongated structure 64 will result in a rotational movement of the associated reel in a clockwise direction thus retracting the associated elongated element. The retracting mechanism 42 is operable to effect such a rotational movement of the elongated structure 64. As shown, the retracting mechanism 42 includes a piston member 136 having a splined aperture 138 formed in the central portion thereof which slidably engages a splined exterior peripheral portion 140 formed on the elongated structure 64 within the power section 20. The piston member 136 is thus connected with the elongated structure 64 to rotate therewith but is capable of relative longitudinal movement with respect thereto. The outer periphery of the piston member 136 is preferably provided with an annular seal 142 which is arranged to engage a cylindrical interior peripheral surface 144 formed on the housing part 52 of the power section 40.

Extended from one side of the piston member 136 is a cylindrical sleeve-like portion or piston rod 146 having a pair of apertures 148 extending through the outer end portion thereof. Formed on the exterior periphery of the sleeve portion 146 and extending between the apertures 148 is a spiral groove 150 within which a multiplicity of balls 152 of a hard material are rollingly engaged. Mounted within the sleeve portion 146 is a sleeve member 154 which is detachably fixedly connected with the sleeve portion, by any suitable means, such as a removable pin 156 extended through registering apertures in the sleeve portion and sleeve member.

Formed in the exterior periphery of the sleeve member 154 adjacent the outer end portion thereof, is a longitudinal extending slot 158, the ends of which communicate with the pair of apertures 148. The apertures and the groove 158 thus provide a return tunnel for the balls 152, such tunnel forming a portion of an endless path of movement for the balls 152, the remaining portion of which is defined by the helical groove 150 and a cooperating helical groove 160 formed in the adjacent interior peripheral surface of the housing part 52. The engagement of the balls 152 within the cooperating helical grooves 150 and 160 serves to impart a rotational movement to the piston member 136 in response to the longitudinal movements thereof. As previously indicated, the elongated rigid structural 64 is splined to the piston member so as to rotate in response to the piston member. In this way, the longitudinal movement of the piston member will effect a rotational movement of the elongated rigid structure 64.

It will be noted that the interior periphery of the housing part 52, the exterior periphery of the central portion of the elongated structure 64 and the adjacent interior surfaces of the divider members 60 define an annular chamber 162 within which the piston member 136 is movable. The chamber 162 is adapted to be connected with a pressurized fluid system, such as the hydraulic system of the aircraft for the purpose of effecting a longitudinal movement of the piston member 136 therein. To this end, the housing part 52 is formed with a pair of openings 164 and 166 communicating with the opposite ends of the chamber 162. The openings 164 and 166 are connected with the valve mechanism 44 through hydraulic lines 168 and 170, respectively, each of which preferably has embodied therein a conventional flow control valve, as indicated at 172 in FIGURE 1.

The valve mechanism 44 is preferably a double solenoid actuated three position 4-way valve providing a vent for the line 170 in the intermediate position. The valve mechanism may be of any desired construction, a more or less schematic illustration of one embodiment being illustrated in FIGURES 2 and 3 of the drawings. While the construction shown forms no part of the present invention, briefly it will be noted that the valve mechanism includes a pair of solenoid coils 174 and 176. The valve mechanism is such that when the solenoid coil 174 is energized, the line 168 is communicated with a pressure line 178 of the hydraulic system of the aircraft and the line 170 is communicated with a low pressure line 180 of the hydraulic system of the aircraft. Energization of the solenoid 176 has the effect of reversing the communication of the lines 178 and 180 with the lines 168 and 170. When neither of the solenoid coils are energized, the valve mechanism is disposed in an intermediate position wherein communication between the high pressure line 178 and the line 168 is closed whereas the line 170 is either vented to the atmosphere through a blow out plug 182 or is communicated with the low pressure line 180.

The purpose of the vent blow out plug 182 is to permit independent retractive movement of the piston member 136 through the ignition of a gas generating ballistic charge 184. The ballistic charge 184 may be of any conventional design, however, as shown, it is of the cartridge type having a percussion igniter embodied therein and a propellant material which is ignited by the percussion igniter to burn and provide the desired amount of pressurized gases at a desired rate to effect the desired retractive movement of the piston member 136.

Preferably, the ballistic charge 184 is mounted within a charge receiving chamber 186 formed in the central interior portion of the elongated rigid structure 164. Any suitable means may be provided for igniting the charge and with the percussion ignition type of charge disclosed, ignition is preferably accomplished by means of a striker element 188 mounted within a cylindrical chamber 190 formed in the inner end portion of the member 106. The striker element 188 is suitably sealed within the chamber 190 and retained in a position therein spaced from the charge 184 by a sheer pin 192 which is adapted to fracture when a predetermined gas pressure is applied to the striker element 188. Such gas pressure is applied by the conventional ejection equipment of the aircraft (not shown) through a passage 194 formed in the outer end portion member 106 having one end communicating with the chamber 190 and its opposite end communicating with an opening 196 formed in the adjacent end closure 108.

The gases generated by the ignition of the ballistic charge 184 are communicated to the chamber 162 through radial openings 198 formed in the elongated structure 64 in communication with the end portion of the charge receiving chamber 186 opposite from the striker element 188. In order to normally seal the ballistic charge from the hydraulic fluid in the chamber 162 and at the proper time permit communication of the gases generated by the ignition of the charge within the chamber, there is provided a plug member 200 within the charge receiving chamber 186 which is resiliently urged, as by a coil spring 202 or the like, into a position between the openings 198 and the adjacent end of the ballistic charge 184. The plug 200 is of such size that upon ignition of the ballistic charge, the gas pressures generated will move the same against the action of the spring 202 into a position within the enlarged end of the chamber 186 on the opposite side of the openings 198.

It can thus be seen that the retracting mechanism 42 can be operated independently either through actuation of the valve mechanism 44 or the ignition of the ballistic charge 184. The latter is preferably set to be ignited in response to actuation of the ejection system of the aircraft. The valve mechanism 44 is preferably set to operate in response to the tripping of the inertia or acceleration sensitive switch assembly 46 or through movement of the manual switch assembly 48.

Referring now more particularly to FIGURE 9, there is shown therein a schematic wiring diagram which indicates the manner in which the valve mechanism 44 is alternatively controlled either by the switch assembly 46 or the switch assembly 48. As previously indicated, the valve mechanism 44 includes a pair of solenoid coils 174 and 176, the coil 174 being connected across a pair of main power lines 204 and 206 in series with one terminal 208 of the switch assembly 48, as by leads 210 and 212. In a like manner, the coil 176 is connected across the main line 204 and 206 in series with a second terminal 214 of the manual switch assembly 48, as by a pair of leads 216 and 218. It will be noted that the manual switch assembly 48 also includes an intermediate terminal 220 to which one end of a lead 222 is connected. The lead 222 is thus connected with the main line 206 when the manual switch assembly 48 is in its normal intermediate position and a parallel energizing circuit for the solenoid coil 174 is provided under the control of a switch 224 of a holding relay 226, which is connected in series between the leads 212 and 222, as by leads 228 and 230. The holding relay 226 includes a coil 232 one end of which is connected with the main line 204, as by a lead 234. The opposite end of the holding relay coil 232 is connected in parallel with the lead 222 first through the acceleration switch 46, as by leads 236 and 238, and second through a switch 240 of the holding relay, as by leads 242 and 244.

The acceleration sensitive switch assembly 46 may be of any suitable construction, a preferred embodiment of which is illustrated in FIGURE 10. As shown, the switch assembly includes a switch body 246 providing a central cavity 248 and three generally cylindrical body portions 250, 252 and 254 extending outwardly therefrom so that in operative position the portion 252 extends in a direction rearwardly of the seat assembly while the portions 250 and 254 extend in opposite directions at right angles to the portion 252, as clearly indicated in FIGURE 1. Each of the cylindrical portions has a cylindrical inertia member 256 mounted therein for longitudinal sliding movement. Each cylindrical inertia member is resiliently urged into an outward limiting position against a stop pin 258 by a tension spring 260 connected at one end to a lug formed on the outer end of the associated inertia member and at its opposite end to a headed pin 262. Each pin 262 is mounted within a suitable plug or the like 264 engaged within the outer end of the associated cylindrical portion. Each inertia member 256 has a pin 266 extending from the inner end thereof which is arranged to engage a microswitch 268 when the associated inertia member is moved out of its outward limiting position against the action of the associated spring 260 by the application of a suitable acceleration force acting in the appropriate direction.

As best shown in FIGURES 2, 3 and 7, each reel stopping mechanism 36 includes a piston member 270 having an O-ring seal 272 formed in its outer periphery for engaging an interior cylindrical surface 274 formed on the inner end portion of the associated housing part 50. The end of each piston member 270 opposite from the central power section 40 is reduced in diameter to engage an O-ring seal 276 mounted within the inner periphery of an annular flange 278 formed on the central interior port of each housing part 50. The interior periphery of each housing part 50 and the exterior periphery of the piston member 270 between the O-ring seals 276 and 272 define a pressure chamber 280 which communicates with an exterior opening 282 formed in the associated housing part 50.

Each piston member 270 is threadedly engaged, as indicated at 284, with the exterior periphery of the hub portion 74 of the associated reel 72. The outer periphery of each piston member 270 has a groove 286 formed therein which extends longitudinally inwardly from the end thereof adjacent the central power section 40. A pin 288 removably secured in the associated housing part 250 engages within the groove 286 and serves to prevent rotational movement of the piston member 270 so that by virtue of the threaded connection 284, the piston member 270 will move longitudinally in response to the rotary movement of the associated reel 72.

The longitudinal movement of each piston member corresponding to the extensive rotational movement of the associated reel is hydraulically controlled by the control assembly 38 to effect an axial movement of the associated reel in a direction toward the power section 40 to apply a friction braking means, indicated at 290, which, as shown, is formed by a braking surface on the free end of reel portion 74 and the coextensive oppositely facing surface portion of the associated divider wall 60. The chamber 280 of each reel stopping mechanism 36 is hydraulically connected with the control assembly 38 by any suitable means, such as a conventional flow divider 292 having a pair of separate lines 293 extending therefrom to the openings 282 and a single line 294 extending therefrom to the control assembly 38.

Figure 11:
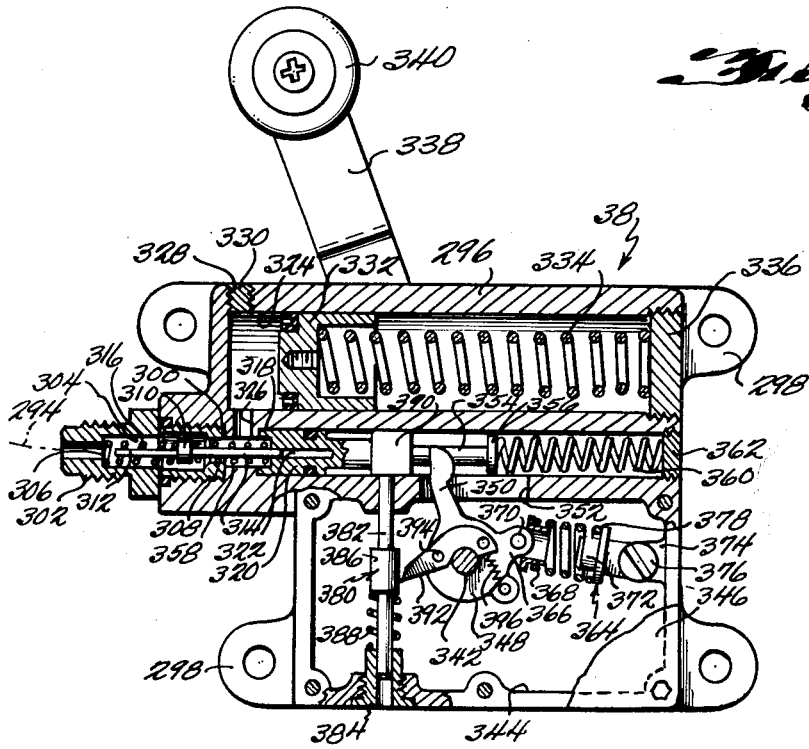
FIGURE 11 is a vertical sectional view of the control assembly for the reel device, illustrating the parts in their normally operative position.
Figure 12:
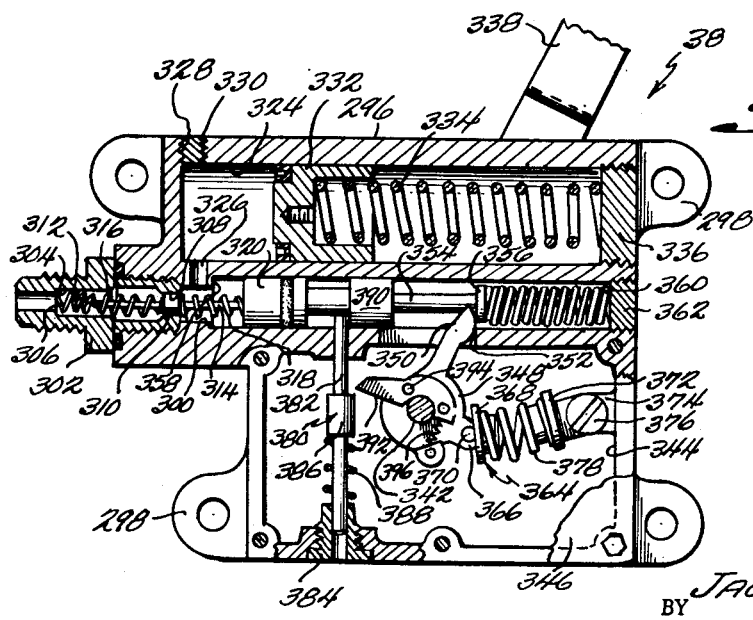
FIGURE 12 is a view similar to FIGURE 9, illustrating the parts in their manually actuated position.

Referring now more particularly to FIGURES 11 and 12, the control assembly 38 includes a main housing 296 having four apertured lugs 298 formed thereon through which the housing is attached to the seat assembly by any suitable fastening means. Formed in the housing is a central horizontally extending cavity or bore 300, one end of which is threaded to receive a nipple member 302 which is connected with the adjacent end of the line 294. The nipple member 302 includes a central cavity 304 which communicates at one end with the line 294 through a reduced opening forming a shoulder 306. The opposite end of the cavity 304 communicates with the bore 300 through a cylindrical opening 308 of a diameter intermediate that of the cavity and the opening communicating the same with the line 294. Mounted for reciprocating movement through the cylindrical opening 308 is a cylindrical inertia valve member 310 having a diameter which is substantially equal to the diameter of the opening 308. Extending from opposite ends of the cylindrical valve member 310, is a pair of valve stem portions 312 and 314, each of which has a coil spring 316 and 318, respectively, disposed in surrounding relation thereto. It will be noted that the coil spring 316 is disposed within the cavity 304 and has one end in engagement with the shoulder 306 and the opposite end thereof in engagement with the valve member 310. The other spring 318 has one end disposed in engagement with the valve member 310 and its opposite end disposed in engagement with a piston member 320 mounted within an enlarged portion of the bore 300. The central portion of the piston member is apertured, as indicated at 322, to receive the adjacent end of the associated valve stem portion 314.

The portion of the bore 300 adjacent the nipple 302 is communicated with a cylindrical reservoir chamber 324 formed in the upper portion of the housing, as by a radial opening 326 formed in the wall of the housing between the bore 300 and chamber 324. The opening 326 is formed in the housing by drilling through an opening 328 forming in the alignment therewith in the exterior wall of the housing, through which the control assembly may be filled with hydralic fluid. The opening 328 is closed by any suitable means, such as a plug 330 threadedly engaged therein. Slidably mounted within the cylindrical chamber 324 is a piston member 332, which constitutes a pressure sensitive means operable to permit expansion and contraction of the chamber 324 in response to variations in the pressure of the hydraulic fluid therein. To this end, a coil spring 334 is mounted within the end of the cylindrical chamber 324 opposite from the aperture 326 so as to resiliently urge the piston member in a direction to contract the volume of chamber 324 when the pressure of the hydraulic fluid therein is reduced and to resiliently urge the piston member in a direction to expand the chamber 324 when the pressure of the hydraulic fluid therein is increased. As shown, one end of the coil spring 324 is engaged with the piston member and the opposite end thereof is engaged with a plug 336 threadedly engaged within the opposite end of the cylindrical chamber 324.

The control assembly 38 also includes a manual control lever 338 which, when disposed in the position shown in FIGURE 11, permits automatic operation of the reel stopping mechanisms 36 under the control of the valve member 310. The lever 338 is movable from the position shown in FIGURE 11 to a position shown in FIGURE 12 to effect a manual actuation of the reel stopping mechanisms 36. To this end, it will be noted that one end of the control lever 338 is provided with a handle or gripping knob 340 and the opposite end thereof is keyed to a shaft 342. The shaft is journalled within a lower portion of the housing 296, which portion provides a cavity 344 which is opened on one side and arranged to be selectively closed, as by detachable closure plate 346. The shaft 342 is journalled in the wall of the housing 296 defining one side of the cavity 344 and the cover plate 346 and extends outwardly of the housing wall for connection with the adjacent end of the control lever 338.

Fixed to the central portion of the shaft 342 is an annular member 348 having an arm 350 extending radially outwardly therefrom. The outer end of the arm 350 is bifurcated and extends into the enlarged portion of the bore 300 through an elongated opening 352 formed in the adjacent wall of the housing 296, and embraces a piston rod or stem 354 in the bore 300 having one end fixed to the piston member 320 and a flanged portion 356 formed on the opposite end thereof. The portion of the bore 300 adjacent the opening 326 is of a reduced diameter and forms with the enlarged portion of the bore an annular shoulder 358 which limits the movement of the piston member in a direction toward the nipple member 302. The piston member 320 is resiliently urged into the above mentioned limiting position, as shown in the FIGURE 11, by any suitable means, such as a coil spring 360 disposed within the opposite end portion of the bore 300 and acting between the flanged end portion 356 and a plug 362 engaged within the adjacent end of the bore 300.

An over-center toggle linkage, generally indicated at 364, is provided for the purpose of resiliently maintaining the control lever 338 either in the automatic operating position shown in FIGURE 11 or in the manual operating position shown in FIGURE 12. The over-center toggle linkage 364 includes an apertured lug 366 formed integrally on the annular member 348 fixed to the shaft 342. A first flanged stud member 368 having a bifurcated end is pivoted to the lug 366, as by a pivot pin 370. A second flange stud member 372 having a bifurcated end is pivoted to a lug 374, as by the pivot pin 376. The lug 374 is formed on the wall of the housing 296 which defines the cavity 344 adjacent the plug 362. A coil spring 378 is disposed between the flanged stud members and has the ends thereof disposed in surrounding relation with the stud members and in engagement with the flanges thereof.

It will be noted that the pin 376 and shaft 342 provide two fixed axes of the over-center toggle linkage 364. When the control lever 338 is disposed in the position shown in FIGURE 11, the movable pivot pin 370 will be disposed above a plane passing through the fixed axes so that the spring 378 will serve to resiliently maintain the lever in that position. When the lever is moved from the position shown in FIGURE 11 to the position shown in FIGURE 12, the spring 378 of the toggle linkage 364 will yield permitting the movable pivot pin 370 to move from a position disposed above the common plane of the fixed axes to a position disposed below such a plane. Consequently, the spring 378 will also serve to resiliently maintain the control lever 338 in the position shown in FIGURE 12.

The control assembly 38 also includes a locking mechanism 380 which is operable to maintain the valve member 310 in a brake applying position once the same has been moved therein. To this end, the locking mechanism 380 includes a detent pin 382 having its upper end mounted within an opening in the housing wall communicating with the central portion of the bore 300 and its lower end mounted within a removable nipple 384. Formed on the central portion of the pin 382 is a cylindrical land portion 386, the lower end of which engages the upper end of a spring 388. The coil spring 388 is disposed in surrounding relation to the lower end of the pin 382 and has its lower end disposed in engagement with the nipple 384 and thus serves to resiliently urge the detent pin 382 in an upward direction. When the piston member 320 is disposed in the limiting position shown in FIGURE 11, the upper end of the detent pin 382 engages the lower periphery of a cylindrical land portion 390 formed on the adjacent portion of the piston rod member 354. It can be seen that when the piston rod member 354 is moved to the right along with the piston member 320 either because of automatic operation or because of the movement of the control lever 338, the end of the land portion 390 will be moved beyond the extremity of the detent pin 382. Through the action of the spring 388 the upper end of the detent pin 382 will move into the bore 300 so as to prevent the return movement of the piston member 320 under the action of the spring 360 into the limiting position shown in FIGURE 11.

A releasing finger 392 is pivotally mounted on the annular member 348, as indicated at 394. The releasing finger is resiliently maintained in the positions shown in FIGURES 11 and 12 by a coil spring 396 connected between a lug on the annular member 348 and a pin mounted on a curved extension of the finger 392. It will be seen that the spring 396 serves to resiliently bias the curved extension of the finger 392 into engagement with the shaft 342. In this way, when the releasing finger 392 is disposed in the position shown in FIGURE 11, movement of the control lever will result in a counter clockwise pivotal movement of the finger about the pivot pin 394 against the action of the spring 396 due to engagement of the extremity of the finger with the land portion 386. As the finger passes the upper end of the land, it will pivot back into its limiting position by the action of the spring 396. In this way, the finger 392 is disposed in a position to engage the upper end of the land portion 386 and effect movement of the detent pin downwardly when the control member is moved from the position shown in FIGURE 12 to the position shown in FIGURE 11.

*Operation*

It will be understood that in normal operation the elongated elements 26 and 28 will payout from their respective reels 72 in response to the movement of the seat occupant in the direction away from the seat back through the operation of the shoulder belt straps 20 and 22. The extension of the elongated elements effects a rotational movement of the associated reels in a counter clockwise direction, as viewed in FIGURES 4 through 6. This movement of each reel is independent of the movement of the other and is against the action of the associated spiral spring 130. Each spiral spring serves to effect clockwise rotational movement of the associated reel 72 when the seat occupant moves toward the back seat. The strength of the springs 130 is such as to provide for a clockwise rotation of the reels sufficient to maintain the elongated elements in a generally taut condition while at the same time not offering any substantial resistance to the counter clockwise rotation of the reels.

The power section 40 is operable under several conditions. First, in the event of a predetermined abnormal acceleration condition in the aircraft in a direction acting to cause one or more of the inertia members 226 of the inertia switch assembly 46 to close the associated microswitches 268, will result in a power retraction of the reels into their retracted limiting positions. As shown in FIGURE 9, closing of a microswitch 268 will energize the coil 232 of the holding relay 226, through leads 222, 238, 236, and 234, which in turn closes switches 240 and 224, completing the parallel energizing circuit to the coil, through leads 244 and 242, and energizing the solenoid coil 174 of the valve mechanism 44, through leads 210, 212, 228, 230 and 222. Energization of the coil 174 will effect a movement of the valve mechanism 44 into the position shown in FIGURE 2 thereby connecting the high pressure hydraulic line 178 of the aircraft to the line 168 communicating with the chamber 162 on the left hand side of the piston member 136, as shown in FIGURE 2. The opposite side of the chamber 162 is, in turn, communicated by the valve mechanism 44, through the line 170 to the exhaust line 180 of the aircraft. Thus, with the valve mechanism 44 in the position shown in the FIGURE 2, the hydraulic pressure of the aircraft hydraulic system will effect a movement of the piston member 136 to the right as shown in FIGURE 2. This movement of the piston will effect, through the operation of the helical grooves 150 and 160 and balls 152, the rotational movement to the piston member 136 which, in turn, is transmitted to the elongated rigid structure 64 through the spline connection 138 and 140.

The number of revolutions thus imparted to the elongated rigid structure 64 throughout the entire stroke of the piston member is substantially equal to the number of revolutions which each reel is permitted by the associated lost motion connection 112, that is, slightly less than four revolutions. Moreover, the pitch of the helical grooves 150 and 160 are such as to cause clockwise rotational movement of the elongated rigid structure 64, as viewed in FIGURES 4–6. It can thus be seen that if either or both of the reels 72 are in the extended limiting position, such as shown in FIGURE 5, or in any intermediate position between that shown in FIGURE 5 and that shown in FIGURE 6, the clockwise rotation movement of the elongated rigid structure 64 through the full stroke of the piston member 136 will result in a movement of both reels into their retracted limiting positions in which the lost motion connection is disposed in the relationship shown in FIGURE 5. Moreover, the valve mechanism 44 will remain in the position shown in the FIGURE 2 by the holding relay 226 so that the reels are held in their retracted limiting positions, such position corresponding with one in which the shoulder belt straps 20 and 22 hold the seat occupant in an erect position against the back of the seat.

In the event that the conditions which caused actuation of the inertia switch assembly 46 are alleviated without the necessity of ejection, the power section 40 can be reset simply by moving the manual switch assembly 48 to engage contact 214 which has the effect of first braking the circuit of the holding relay 226 thus deenergizing valve solenoid coil 174 and then energizing the coil 176 of the valve mechanism 44, through leads 216 and 218, as shown in FIGURE 9. The energizing of the coil 176 will move the valve mechanism 44 in the opposite position to that shown in FIGURE 2 so as to reverse the flow in the lines 168 and 170, respectively, to the low pressure line 180 and high pressure line 178 of the hydraulic system of the aircraft. In this way, the piston member 136 is moved back into position shown in FIGURE 2 causing the elongated rigid structure 64 to assume a relationship with respect to the lost motion connections 112, as shown in FIGURE 6, assuming that the associated reels are disposed in their retracted limiting positions. Thus, normal operation of the reels can be resumed. It will also be understood that by moving the manual switch assembly 48 into a position wherein contact 208 is closed, a power stroke of the piston member 136 can be manually selectively obtained by the seat operator whenever desired by energization of the valve solenoid coil 174 through leads 210 and 212.

The ballistic retraction of the reels is accomplished by the same retraction mechanism within the device 30 described above in connection with hydraulic power retraction. While it would be possible to initiate the ballistic retraction simultaneously with or slightly after hydraulic power retraction through operation of the inertia switch 46, the ballistic retraction can be initiated independently of hydraulic power retraction. Stated differently, if the ballistic retraction is initiated simultaneously with or slightly after hydraulic power retraction, the desired effect of retracting the reel members is obtained in any event. On the other hand, the ballistic actuation can be initiated to retract the reels when necessary in those situations where hydraulic power retraction has not already been initiated manually or automatically. Preferably, the ballistic retraction is initiated in response to the initiation of the conventional ejection system of the aircraft seat assembly. The initiation of this system will have the effect of conveying a gas pressure to the striker element 188 of a force sufficient to break the frangible pin 192 and drive the striker element into the percussion igniting means of the ballistic charge 184. In this way, the ballistic charge 184 is ignited thus creating gases within the chamber 186. The gases under pressure thus created will drive the plug 200 against the action of the spring 202 beyond the openings 198 so as to communicate the gases with the left hand side of the chamber 162 as shown in FIGURE 2.

As best shown in FIGURE 3, the gas pressure on the left hand side of the piston member 136 will increase the pressure in the fluid on the right hand side of the piston member to a value sufficient to cause the vent plug 192 to blow out. In this way, the hydraulic fluid in the right hand side of the chamber 162 is allowed to exhaust so that the piston member 136 can move toward the right, as viewed in FIGURE 3, and effect a clockwise rotation of the elongated rigid structure 64, as viewed in FIGURES 4 through 6, to, in turn, effect retraction of the reels, in the same manner as indicated above. It should be noted that the venting of the hydraulic fluid in the right hand side of the chamber 162 under the ballistic actuation controls the maximum movement of the piston member 136 so that the ballistic retraction is obtained without the imposition of unduly high peak forces on the seat occupant.

In addition to the above power retraction operations, the reel stopping mechanisms 36 are operable to retard and stop counter clockwise rotational movement of the reels, as viewed in FIGURES 4 through 6, in response to either a predetermined velocity of extension of the associated elongated element or a predetermined deceleration of the aircraft acting in a longitudinal forward direction. This operation is obtained in the following manner. First, each piston member 270, by virtue of the threaded connection 284 with the associated reel hub portion 74 and the associated pin and slot connection 286 and 288, will move in a direction away from the power section 40 in response to the extension of the associated elongated element or the counter clockwise rotational movement of the associated reel 72, as viewed in FIGURES 4 through 6. Conversely, each piston member 270 will move in the opposite direction in response to the movement of the associated reel in the opposite direction. Consequently, the extension of each elongated element will result in a movement of hydraulic fluid from the associated chamber 280 through the lines 293, flow divider 292, and line 294 into the control assembly 38.

Under normal operating conditions, the control assembly 38 will be disposed in the position shown in the FIGURE 11. So long as the extensions of the elongated elements are at speeds which would be imposed by normal body movements of the seat occupant, the flow of hydraulic fluid into the control assembly 38 will pass through the opening 308 into the bore 300 and finally into the reservoir chamber 324 through the opening 326. In a like manner, retractive movements of the elongated elements such as by normal body movements of the seat occupant toward the seat back, will simply result in a passage of fluid from the reservoir chamber 324 outwardly of the control assembly 38 to the respective chambers 280 in the reversed direction. In this way, the control assembly 38 readily permits a normal retraction and extension of the elongated elements either separately or simultaneously at the same speeds or at different speeds without the application of any braking action.

In the event that the seat occupancy is subjected to forces, as in emergency or other abnormal conditions, which would tend to move the seat occupant away from the back of the seat at speeds greater than that normally encountered, a greater energy will be imparted to the hydraulic fluid flowing to the control assembly 38 from the respective chambers 280. At a predetermined energy condition in the hydraulic fluid, there will be a sufficient pressure drop across the valve member 310 to overcome the relatively light force of the coil spring 318 thus causing the valve member to move into a position blocking the opening 308, as shown in FIGURE 12. When the valve member 310 reaches this position, there is an instantaneous rise in the pressure in the respective chambers 280 which effectively resists movement of the associated piston members 270. In this way, the continued rotation of the reels will result in an axial movement thereof thus applying the braking means 290 so as to retard the rotational movement of the reels.

In most instances this initial braking action will not be sufficient to stop the rotation of the associated reel without the build-up of additional pressure in the associated chamber 280, in which case, if the additional pressure builds up to the point where it is sufficient to move the valve member 310 through the opening 308 against the action of the relatively stiff spring 360 connected with the piston member 320, the land 390 connected with the piston member 320 will move into position shown in FIGURE 12 permitting the detent pin 382 to lock the piston member against movement back into position shown in FIGURE 11. Under these circumstances, the valve member 310 will be biased by the springs 316 and 318 into a position within the opening 308 as shown in FIGURE 12, thus trapping the hydraulic fluid within the respective chambers 280 and preventing any further extension of the associated elongated element. It will be understood, however, that the application of the braking means will in no way prevent the operation of either the hydraulic power retraction or the ballistic retraction since both of these operations will act in a direction to back off the associated reels from the action of the braking means.

The above operation of the valve member 310, except for the operation of the detent pin 382, is generally similar to that described in my above mentioned copending application. The theoretical curve obtained by plotting the force opposing the extension of the elongated elements against the velocity of the extension of the elongated elements would be generally the same as that shown in FIGURE 9 of my copending application. It will be understood, however, that the particular points along the curve at which the valve member 310 moves into engagement with the opening and then out of engagement thereof will be varied to suit the particular aircraft requirements. For aircraft installation it would be desirable to apply a greater braking force in order to stop the seat occupant within a shorter distance than in automotive installation.

In addition to the above, it will be noted that the control assembly 38 of the present invention is mounted on the seat assembly 10 so that the axis of the valve member 310 extends longitudinally with respect to the aircraft. Thus, because the valve member 310 is floatingly mounted by means of the springs 316 and 318, a predetermined deceleration force acting in a longitudinal forward direction will, due to the mass or inertia of the valve member, move from the position shown in FIGURE 11 to the position shown in FIGURE 12 thus insuring that an immediate braking action will be applied in response to any extension of the associated elongated elements irrespective of the velocity of the extension.

In the event that the condition resulting in a movement of the valve member 310 and the piston member 320 into its locked position, as shown in FIGURE 12, is alleviated without the necessity of ejection, the reel stopping mechanisms are capable of being reset by manual operation of the control assembly 380. This is accomplished by moving the manual control lever 338 from the position shown in FIGURE 11 to the position shown in FIGURE 12 so as to dispose the releasing finger 392 in a position above the land member 386, in the manner previously described in detail. The stopping mechanisms are reset by effecting a final movement of the control lever from the position shown in FIGURE 12 to the position shown in FIGURE 11, during which movement, the detent pin 238 is first moved downwardly by the releasing finger 392 and finally the piston member 320 is allowed to return to the limiting position shown in FIGURE 11 under the action of spring 360, in the manner previously indicated in detail.

Finally, it will be understood that in the event the seat occupant desires to lock the elongated elements against extension by manual movement of the seat occupant away from the seat back, this can be accomplished merely by moving the control lever 338 from the position shown in FIGURE 11 to the position shown in FIGURE 12. Conversely, by moving the control lever 338 back from the position shown in FIGURE 12 to that shown in FIGURE 11, the device 30 can be reset for normal operation whenever desired.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A safety device for a seat occupant comprising a housing, a reel carried by said housing for rotational movement in opposite directions, a flexible elongated element connected at one end to said reel so as to be wound up on said reel in response to rotational movement of said reel in one direction, resilient means acting between said housing and said reel for resiliently urging said reel toward a limiting position in said one direction of rotational movement wherein a maximum amount of said elongated element is wound around said reel, the opposite end of said elongated element being arranged to be operatively connected with the seat occupant so as to pay out from said reel and effect rotational movement of said reel in the opposite direction against the action of said resilient means in response to movements of the seat occupant in a direction away from a normal erect position with respect to the seat, means operable in response to a predetermined force acting in a direction to effect an abnormal movement of the seat occupant in a direction away from the seat and hence to pay out said flexible elongated element at an abnormal speed for stopping the rotational movement of said reel in said opposite direction, and reel retracting means normally permitting said rotation of said reel in said opposite direction against the action of said resilient means and said responsive operation of said reel stopping means operable through communication with a source of hydraulic fluid under pressure to effect a rotational movement of said reel in said one direction into said limiting position when the latter is disposed in a position away from said limiting position and to retain the same therein and valve means for selectively communicating a source of hydraulic fluid under pressure with said reel retracting means to effect said operation thereof.

2. A safety device as defined in claim 1 including means defining a ballistic charge receiving chamber and a ballistic charge in said chamber ignitable to generate a supply of gas under pressure communicable with said reel retracting means to effect said operation thereof.

3. A safety device for a seat occupant comprising a housing, a reel carried by said housing for rotational movement in opposite directions, a flexible elongated element connected at one end to said reel so as to be wound up on said reel in response to rotational movement of said reel in one direction, resilient means acting between said housing and said reel for resiliently urging said reel toward a limiting position in said one direction of rotational movement wherein a maximum amount of sad elongated element is wound around said reel, the opposite end of said elongated element being arranged to be operatively connected with the seat occupant so as to pay out from said reel and effect rotational movement of said reel in the opposite direction against the action of said resilient means in response to movements of the seat occupant in a direction away from a normal erect position with respect to the seat, means operable in response to a predetermined force acting in a direction to effect an abnormal movement of the seat occupant in a direction away from the seat and hence to pay out said flexible elongated element at an abnormal speed for stopping the rotational movement of said reel in said opposite direction, reel retraction means normally permitting said rotation of said reel in said opposite direction against the action of said resilient means and responsive operation of said reel stopping means for effecting in response to the ignition of a gas generating ballistic charge a single rotational movement only of said reel in said one direction into said limiting position when the latter is disposed in a position away from said limiting position and retaining the same therein and for effecting selectively repeatable rotational movements of said reel in said one direction into said limiting position when the latter is disposed in a position away from said limiting position and retaining the same therein.

4. A safety device for a seat occupant comprising a housing, a reel carried by said housing for rotational movement in opposite directions, a flexible elongated element connected at one end to said reel so as to be wound up on said reel in response to rotational movement of said reel in one direction, resilient means acting between said housing and said reel for resiliently urging said reel toward a limiting position in said one direction of rotational movement wherein a maximum amount of said elongated element is wound around said reel, the opposite end of said elongated element being arranged to be operatively connected with the seat occupant so as to pay out from said reel and effect rotational movement of said reel in the opposite direction against the action of said resilient means in response to movements of the seat occupant in a direction away from a normal erect position with respect to the seat, means operable in response to a predetermined force acting in a direction to effect an abnormal movement of the seat occupant in a direction away from the seat and hence to pay out said flexible elongated element at an abnormal speed for stopping the rotational movement of said reel in said opposite direction, reel retraction means normally permitting said rotation of said reel in said opposite direction against the action of said resilient means and said responsive operation of said reel stopping means operable in response to the ignition of a gas generating ballistic charge to effect a single rotational movement only of said reel in said one direction into said limiting position when the latter is disposed in a position away from said limiting position and to retain the same therein and operable in response to a predetermined acceleration force acting in a direction to effect an abnormal movement of the seat occupant in a direction away from the seat to effect a rotational movement of said reel in said one direction into said limiting position when the latter is disposed in a position away from said limiting position and to retain the same therein.

5. A safety device for a seat occupant comprising a housing, a reel carried by said housing for rotational movement in opposite directions, a flexible elongated element connected at one end to said reel so as to be wound up on said reel in response to rotational movement of said reel in one direction, resilient means acting between said housing and said reel for resiliently urging said reel toward a limiting position in said one direction of rotational movement wherein a maximum amount of said elongated element is wound around said reel, the opposite end of said elongated element being arranged to be operatively connected with the seat occupant so as to pay out from said reel and effect rotational movement of said reel in the opposite direction against the action of said resilient means in response to movements of the seat occupant in a direction away from a normal erect position with respect to the seat, means operable in response to a predetermined force acting in a direction to effect an abnormal movement of the seat occupant in a direction away from the seat and hence to pay out said flexible elongated element at an abnormal speed for stopping the rotational movement of said reel in said opposite direction, fluid operated means within said housing movable between first and second positions, a lost motion connection between said fluid operated means and said reel permitting rotational movement of said reel away from said limiting position in said opposite direction without movement of said fluid operated means when the latter is disposed in said first position and preventing rotational movement of said reel away from said limiting position without movement of said fluid operated means when the latter is disposed in said second position, and means for controlling the communication of a source of hydraulic fluid under pressure with said fluid operated means to effect movement of said fluid operated means from said first position to said second position to thereby effect a rotational movement of said reel in said one direction into said limiting position when said reel in disposed away from said limiting position and to retain the same therein and to effect movement of said fluid operated means from said second position to said first position to thereby permit rotational movement of said reel in said opposite direction away from said limiting position.

6. A safety device as defined in claim 5 wherein said fluid control means includes means operable in response to a predetermined acceleration force acting in a direction to move the seat occupant away from an erect position in the seat to effect said movement of said fluid operated means from said first position to said second position.

7. A safety device as defined in claim 5 wherein said fluid control means includes means operable in response to manual actuation to selectively effect said movements of said fluid operated means from said first position to said second position and from said second position to said first position.

8. A safety device as defined in claim 5 wherein said housing includes means defining a ballistic charge receiving chamber therein, a ballistic charge within said chamber ignitable to generate a supply of gas under pressure, and means normally sealing said charge from said fluid operated means operable in response to the ignition of said charge to communicate the gas generated thereby with said fluid operated means to thereby effect movement of said fluid operated means from said first position to said second position.

9. A safety device for a seat occupant comprising a pair of reel housing sections, a retraction housing section secured between said reel housing sections in longitudinal alignment therewith, a reel carried by each of said reel housing sections for rotational movement in opposite directions, each of said reels having a flexible elongated element connected at one end thereto so as to be wound up on the associated reel in response to rotational movement thereof in one direction, resilient means acting between each of said reel housing sections and the associated reel for resiliently urging the latter toward a limiting position in said one direction of rotational movement wherein a maximum amount of the associated elongated element is wound around the associated reel, the opposite ends of said elongated elements being arranged to be operatively connected with opposite shoulders of the seat occupant so as to pay out from their respective reels and effect rotational movements of said reels in the opposite direction against the action of the associated resilient means in response to shoulder movements of the seat occupant in a direction away from a normal erect position with respect to the seat reel stopping means operable in response to a predetermined force acting in a direction to effect an abnormal movement of the shoulders of the seat occupant in a direction away from an erect position with respect to the seat and hence to pay out said flexible elongated elements at an abnormal speed for stopping the rotational movement of each of said reels in said opposite direction, reel retracting means carried by said retraction housing section including a rigid structure mounted for rotational movement about an axis common to the axis of rotation of each of said reels from a normal inactive position into a reel retraction position, a lost motion connection between each reel and the adjacent end of said structure permitting independent rotational movement of each reel away from said limiting position in said opposite direction without movement of said structure when the latter is disposed in said normal inactive position and preventing rotational movement of both of said reels away from said limiting position without movement of said structure when the latter is disposed in said reel retracting position, and means for effecting rotational movement of said structure from said normally inactive position to said retracting position.

10. A safety device as defined in claim 9 wherein said reel retracting means further includes means within said retraction housing section defining a cylindrical chamber surrounding said rigid structure, a piston mounted within said chamber, means acting between said piston and said rigid structure for permitting relative longitudinal movement between said piston and said rigid structure and preventing relative rotational movement therebetween, means acting between said piston and said retraction housing section for effecting a rotational movement of said piston in response to longitudinal movement thereof, a three-position four-way valve mechanism connected with opposite ends of the cylindrical chamber within said retraction housing section on opposite sides of said piston operable in one position to communicate a source of hydraulic fluid with one end of said cylinder and to permit exhaust of hydraulic fluid from the opposite end thereof to thereby effect a longitudinal movement of said piston in one direction to effect movement of said rigid structure from said normal inactive position to said reel retraction position, said valve mechanism being operable in a second position to communicate the source of hydraulic fluid under pressure with the opposite end of said cylinder and to exhaust said one end of said cylinder to thereby effect longitudinal movement of said piston in the opposite direction thereby moving said rigid structure from said reel retraction position to said normal inactive position, said valve mechanism being operable in a third position to prevent communication of fluid under pressure to said cylindrical chamber and exhaust of fluid under pressure from said cylindrical chamber.

11. A safety device as defined in claim 10 including means operable in response to a predetermined acceleration force acting in a direction to move the seat occupant in a direction away from the seat for effecting movement of said valve mechanism into said first position.

12. A safety device as defined in claim 11 including manual means for selectively effecting a movement of said valve mechanism into any one of said three positions.

13. A safety device as defined in claim 12 wherein said rigid structure includes means defining a ballistic charge receiving chamber therein, a ballistic charge in said charge receiving chamber ignitable to provide a supply of gas under pressure, means normally providing a seal between said ballistic charge and said cylindrical chamber operable in response to the ignition of said charge for communicating the supply of gas under pressure generated thereby to said one end of said cylindrical chamber, and blow plug means communicating with the hydraulic fluid in the opposite side of said cylindrical chamber when said valve mechanism is disposed in said third position for permitting exhaust of the fluid therefrom when the same reaches a predetermined pressure condition as a result of communication of the supply of gas pressure to the opposite end thereof whereby said piston is movable in said one direction to effect movement of said rigid structure from said normally inactive position to said reel retraction position.

14. A safety device as defined in claim 9 wherein said reel stopping means includes a control assembly having a hydraulic reservoir chamber formed therein, each of said reel housing sections having means therein defining a cylindrical chamber, a piston mounted within each cylindrical chamber for longitudinal movement in opposite directions, means operatively connected between each reel and the associated piston for effecting axial movement of the latter in one direction and in an opposite direction in response to the rotational movement of the associated reel in said one direction and said opposite direction respectively, means defining a flow path between said cylindrical chambers and said reservoir chamber, valve means in said flow path normally disposed in a first position permitting substantially unrestricted flow between said cylindrical chambers and said reservoir chamber in response to the rotational movements of said reels in said one direction and said opposite direction at speeds resulting from normal seat occupant movements movable into a second position substantially blocking the flow of fluid from said cylindrical chambers to said reservoir chamber in response to the rotational movement of said reels in said opposite direction at speeds resulting from abnormal movement of the seat occupant in a direction away from the seat to establish a minimum predetermined pressure condition in said cylindrical chambers and movable into a third position permitting restricted flow of fluid from said cylindrical chambers to said reservoir chamber in response to the establishment of a second predetermined pressure condition in said cylindrical chambers above said minimum predetermined pressure condition, and friction brake means normally inoperable when said valve means is disposed in said first position operable in response to the movement of said valve means into said second and third positions for retarding and stopping the rotation of each of said reels in said opposite direction.

15. A safety device as defined in claim 14 wherein said valve means includes an inertia valve member movable from said first position to said second position in response to a predetermined acceleration force applied thereto acting in a direction to move the seat occupant away from the seat.

16. A safety device as defined in claim 14 wherein said control assembly further includes valve moving means normally disposed in a first position biasing said valve means into said first position and permitting said responsive movements thereof and movable into a second position biasing said valve means into said second position, said valve moving means being operable to move from said first position into said second position in response to the responsive movement of said valve means into said third position, manually operable means normally disposed in a first position permitting said responsive movements of said valve means and said valve moving means and movable into a second position for effecting movement of said valve moving means into the second position thereof, releasable means for locking said valve moving means in the second position thereof in response to the movement of the same into the second position thereof, and means operable in response to the movement of said manually operable means from the second position thereof to the first position thereof for releasing said releasable locking means.

17. A safety device as defined in claim 16 wherein said valve moving means comprises a piston member mounted within said control assembly with one end thereof communicating with the hydraulic fluid in said flow path between said valve means and said reservoir chamber, a piston rod member extending from the opposite end of said piston, said valve means including a cylindrical valve member having a first spring means acting between one end thereof and said control assembly and second spring means acting between the opposite end thereof and said one end of said piston member.

18. A safety device as defined in claim 17 wherein said manually controlled means comprises a lever mounted for pivotal movement between said first and second positions and a lost motion connection between said lever and said piston rod member, and wherein said releasable means comprises a pin mounted for longitudinal reciprocating movement between said first and second positions, one end of said pin being arranged to engage a land portion on said piston rod to retain the latter in the second position and wherein said means for releasing said releasable means comprises a finger pivotally mounted with respect to said lever for engaging a land portion on said pin.

19. A safety device as defined in claim 14 wherein said friction brake means comprises a braking surface on each of said reels and a coextensive braking surface fixed with respect to the associated reel housing in opposing relation thereto, each of said reels being mounted for limited axial movement whereby the associated braking surface can move toward and away from the associated coextensive braking surface.

20. A safety device for a seat occupant comprising a housing, a reel carried by said housing for rotational movement in opposite directions, a flexible elongated element connected at one end to said reel so as to be wound up on said reel in response to rotational movement of said reel in one direction, resilient means acting between said housing and said reel for resiliently urging said reel toward a limiting position in said one direction of rotational movement wherein a maximum amount of said elongated element is wound around said reel, the opposite end of said elongated element being arranged to be operatively connected with the seat occupant so as to pay out from said reel and effect rotational movement of said reel in the opposite direction against the action of said resilient means in response to movements of the seat occupant in a direction away from a normal erect position with respect to the seat, means for confining a body of hydraulic fluid and providing flow path means for said fluid when energy is imparted thereto, means for imparting energy to said body of fluid of a value less than a predetermined value in response to the rotational movements of said reel in said opposite direction which correspond in speed to those resulting from normal seat occupant movements and of a value greater than said predetermined value in response to greater rotational speeds of said reel in said opposite direction, valve means in said flow path means normally disposed in a first position permitting the energy imparted to said body of fluid of a value less than said predetermined value to be substantially dissipated as velocity energy of fluid flow through said flow path means movable in response to the imparting of energy to said body of fluid of a value greater than said predetermined value into a second position substantially blocking the flow of fluid through said flow path means to establish a minimum predetermined pressure condition in said body of fluid and movable in response to the establishment of a second predetermined pressure condition above said minimum predetermined pressure condition into a third position permitting restricted flow of fluid therethrough, means normally inoperable when said valve means is disposed in said first position operable in response to the movement of said valve means into said second and third positions for retarding and stopping the rotation of said reel in said opposite direction, and manually operable means for selectively effecting movement of said valve means between said first and second positions.

21. A safety device as defined in claim 20 wherein said valve means includes an inertia valve member movable from said first position to said second position in response to a predetermined acceleration force applied thereto acting in a direction to move the seat occupant away from the seat.

22. A safety device for a seat occupant comprising a housing, a reel carried by said housing for rotational movement in opposite directions, a flexible elongated element connected at one end to said reel so as to be wound up on said reel in response to rotational movement of said reel in one direction, resilient means acting between said housing and said reel for resiliently urging said reel toward a limiting position in said one direction of rotational movement wherein a maximum amount of said elongated element is wound around said reel, the opposite end of said elongated element being arranged to be operatively connected with the seat occupant so as to pay out from said reel and effect rotational movement of said reel in the opposite direction against the action of said resilient means in response to movements of the seat occupant in a direction away from a normal erect position with respect to the seat, means for confining a body of hydraulic fluid and providing flow path means for said fluid when energy is imparted thereto, means for imparting energy to said body of fluid of a value less than a predetermined value in response to the rotational movements of said reel in said opposite direction which correspond in speed to those resulting from normal seat occupant movements and of a value greater than said predetermined value in response to greater rotational speeds of said reel in said opposite direction, valve means in said flow path means normally disposed in a first position permitting the energy imparted to said body of fluid of a value less than said predetermined value to be substantially dissipated as velocity energy of fluid flow through said flow path means movable in response to the imparting of energy to said body of fluid of a value greater than said predetermined value into a second position substantially blocking the flow of fluid through said flow path means to establish a minimum predetermined pressure condition in said body of fluid and movable in response to the establishment of a second predetermined pressure condition above said minimum predetermined pressure condition into a third position permitting restricted flow of fluid therethrough, means normally inoperable when said valve means is disposed in said first position operable in response to the movement of said valve means into said second and third positions for retarding and stopping the rotation of said reel in said opposite direction, said valve means including an inertia valve member movable from said first position to said second position in response to a predetermined acceleration force applied thereto acting in a direction to move the seat occupant away from the seat.

23. A ballistic operated reel device comprising a housing, a reel rotatably mounted in said housing, an elongated member connected with said reel to be wound therearound in response to the rotation of said reel in one direction toward a limiting position wherein a maximum amount of said elongated element is wound therearound, a rigid structure rotatably mounted in said housing, said rigid structure having means defining a ballistic charge receiving chamber therein, a ballistic charge in said chamber ignitable to provide a supply of gas under pressure, means within said housing communicable with the supply of gas under pressure created as a result of the ignition of said charge for effecting a rotary movement of said rigid structure by said gas under pressure, and means operatively connecting said rigid structure with said reel for effecting a rotary movement of said reel in said one direction into said limiting position when said reel is disposed in a rotary position away from said limiting position in response to the rotary movement of said rigid structure by said gas pressure.

24. A device as defined in claim 23 wherein said means for effecting rotary movement of said rigid structure by said gas pressure comprises means defining a cylindrical pressure chamber within said housing, a piston mounted within said chamber for longitudinal movement in response to the communication of said gas pressure therewith, means acting between said piston and said housing for effecting a rotary movement of said piston in response to the longitudinal movement thereof, and means acting between said piston and said rigid structure for transmitting the rotary movement of said piston to said rigid structure but permitting said longitudinal movement of said piston with respect to said rigid structure.

25. A device as defined in claim 24 wherein said cylindrical chamber defining means includes the interior cylindrical surface formed on a peripheral wall of said housing, and wherein said means acting between said piston and said housing includes a hollow piston rod member fixed to said piston in surrounding relation to said rigid structure and helical groove and ball means between the exterior periphery of said piston rod members and the interior periphery of said housing peripheral wall.

References Cited by the Examiner
UNITED STATES PATENTS

| | | | |
|---|---|---|---|
| 3,077,324 | 2/63 | Strickland | 244—122 |
| 3,083,938 | 4/63 | Brinkworth et al. | 244—122 |
| 3,096,957 | 7/63 | Peterson et al. | 244—122 |
| 3,105,662 | 10/63 | Wrighton | 244—122 |

FERGUS S. MIDDLETON, *Primary Examiner.*